April 11, 1944.   P. GRAY   2,346,423
LINED TANK AND METHOD OF CONSTRUCTING AND LEAKAGE TESTING THE SAME
Filed Dec. 2, 1940   2 Sheets-Sheet 1
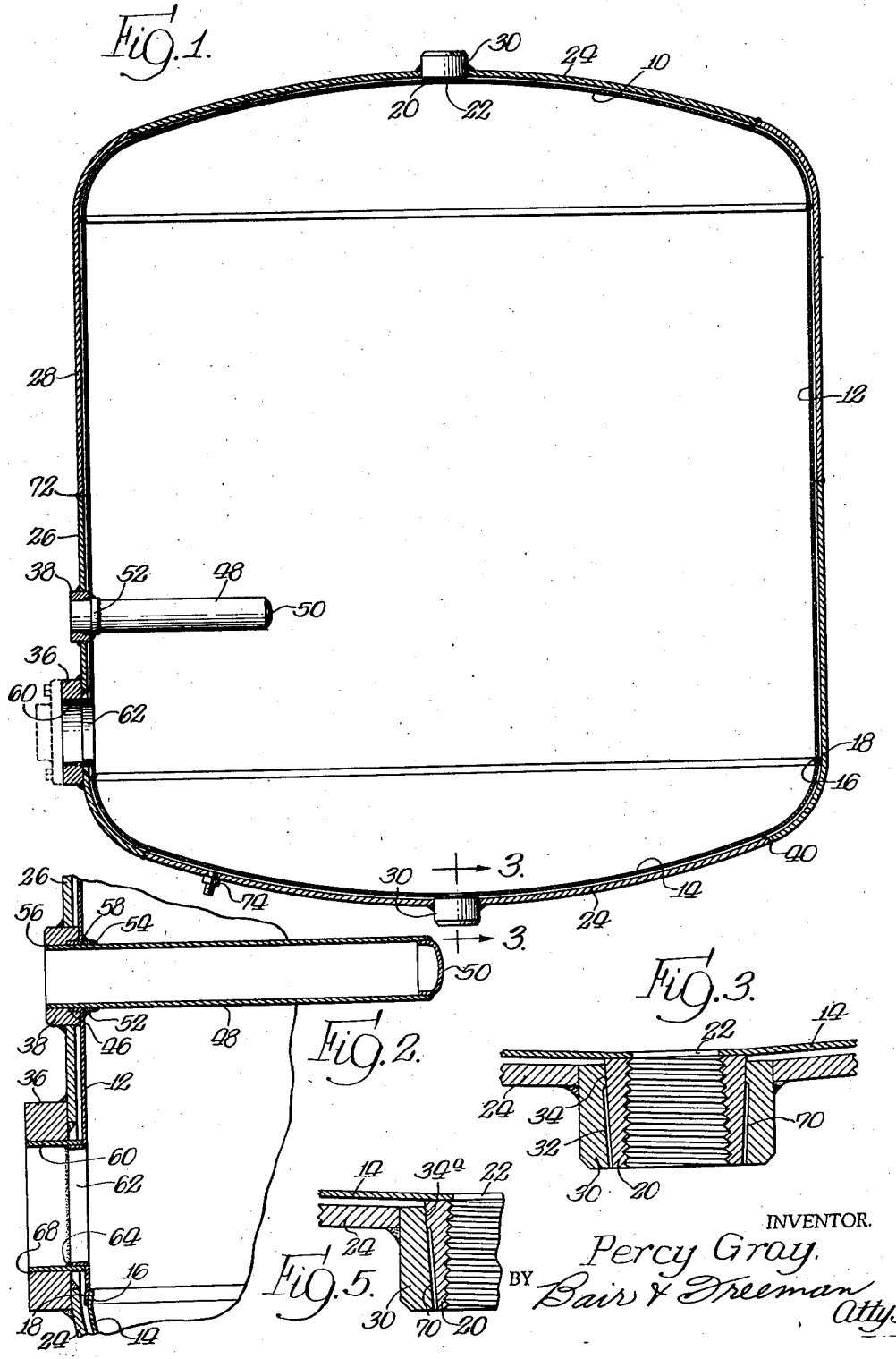
INVENTOR.
Percy Gray.
BY Bair & Freeman
attys.

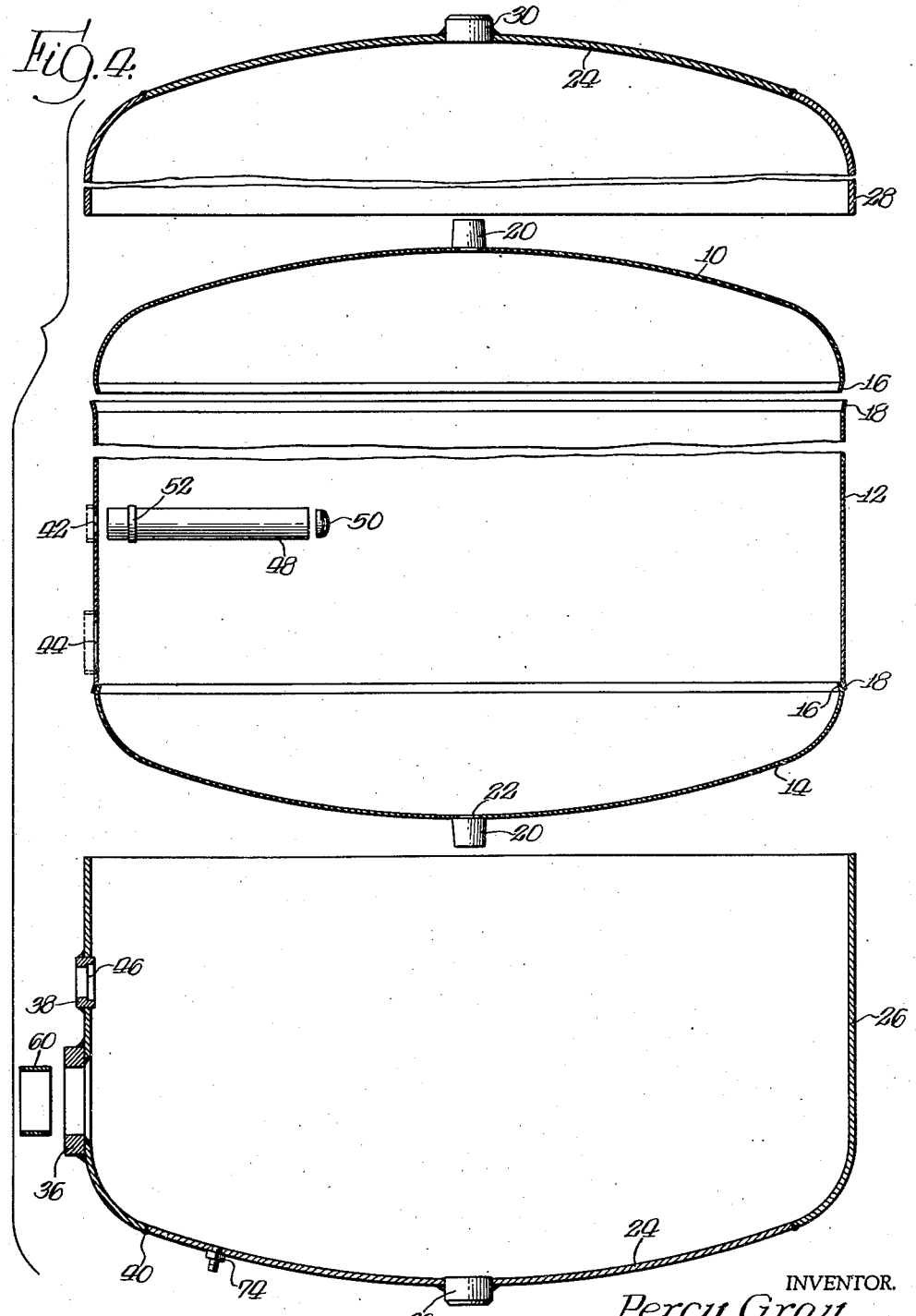

Patented Apr. 11, 1944

2,346,423

UNITED STATES PATENT OFFICE 2,346,423

LINED TANK AND METHOD OF CONSTRUCT-
ING AND LEAKAGE TESTING THE SAME

Percy Gray, Jefferson, Iowa

Application December 2, 1940, Serial No. 368,235

3 Claims. (Cl. 73—51)

In some localities the character of the water is such that ordinary steel tanks used for hot water and the like are subject to corrosion and early failure. At the present time tanks made entirely of non-corrosive metals such as stainless steel, Monel, etc., are very expensive. Copper, which resists corrosion well, is not so expensive but has relatively low strength, so that it is unsatisfactory for use in the construction of tanks unless reinforced in some way.

It is an object of my invention to provide a construction whereby copper or some similar non-corrosive metal may be used as a lining in steel tanks, the steel furnishing the necessary structural strength.

It is a further object of my invention to provide a method of making a lined steel tank in which the lining will resist possible distortion in case a vacuum should occur within the tank.

Another object is to provide a method of assembling a lined tank whereby convenient access to the interior of the tank may be had for performing certain operations in the construction process.

Another object is to provide elements constituting a fitting whereby pipe connections may be made to the finished tank, which elements may be separately attached to the jacket and liner before assembly, and conveniently sealed together after assembly.

Another object is to provide an effective procedure for testing a lined tank after assembly.

With these and other objects in view my invention consists in the construction, arrangement and combination of the various parts of my device, and in the method of carrying out this construction, whereby the objects contemplated are attained, as hereinafter more fully set forth, pointed out in my claims and illustrated in the accompanying drawings, in which:

Figure 1 is a vertical sectional view of an assembled tank embodying the constructional features of my invention.

Figure 2 is an enlarged fragmentary vertical sectional view of the lower left portion of Figure 1.

Figure 3 is an enlarged fragmentary vertical sectional view of the bushing at the bottom end of the tank in Figure 1.

Figure 4 is an exploded view of the parts entering into the tank assembly.

Figure 5 is a view similar to Figure 3, showing a modified form of construction of the fittings.

The copper liner is preferably made up in three principal parts, which I have designated as the top end portion 10, the cylindrical intermediate portion 12 and the bottom portion 14. In many cases the top portion 10 and the bottom portion 14 can be identical in size and shape. At the edge of these portions, the material is turned inwardly, as indicated at 16. The edges of the cylinder 12 are turned outwardly as indicated at 18 so that a joint may be effected between the parts, as shown between the parts 12 and 14 in Figure 4.

In the center of the end members 10 and 14 I provide a tapered bushing 20 of bronze or other corrosion resisting material. The bushing 20 is interiorly threaded, as indicated in Figure 3, and is attached to the end member by brazing or by any other suitable means. The bushing surrounds a hole 22 in the end member to which it is attached.

I provide a steel jacket or shell consisting of end portions 24 and side wall portions 26 and 28. Centrally located in the end members 24 are steel sleeves 30 which have a tapered bore 32 (Figure 3) with a portion adjacent the inner end of similar taper but smaller diameter, the latter portion being designated as 34.

Where other openings into the tank are desired I may provide steel sleeves such as 36 and 38 (Figure 4) which will be subsequently referred to in more detail.

In the assembly of my tank I preferably begin by attaching the end member 14 to the cylindrical portion 12 of the copper lining. This is done by brazing the joint between the edges 16 and 18. The portions 12 and 14 will then constitute a unitary piece, as illustrated in Figure 4.

The end portion 24 of the steel jacket is joined with the side wall portion 26 by welding along the line 40. The copper lining assembly, consisting of the cylindrical portion 12 and the end wall portion 14, can then be lowered into the jacket assembly consisting of portions 24 and 26. When this is done the tapered bushing 20 projecting from the bottom of the copper liner portion will enter the sleeve 30. The tapered formation of these parts obviously facilitates the assembly, since the small end of the bushing 22 enters the large end of the sleeve 30, and is thereby guided into its final position.

The interior dimensions of the steel jacket are somewhat greater than the exterior dimensions of the copper lining assembly, which makes for ease of assembly, in view of the fact that the parts ordinarily are not perfect in shape, and a little tolerance is necessary so that they may go together easily. As an example of the amount of clearance which may be allowed, I have found that approximately one-fourth inch difference in diameter in a tank having a nominal diameter of two feet is satisfactory.

With the assembly operations at this stage, it will be noted that the copper lining is still open at the top, so that its interior is accessible for convenience in certain of the ensuing operations.

In the side of the tank it is sometimes desirable to provide means for mounting a thermostat, and in some cases for mounting an electric heating element. The steel sleeves 36 and 38 are welded to the steel side portion 26 at the desired points. At corresponding points on the copper liner, openings 42 and 44 are made, with diameters somewhat less than the internal diameters of the corresponding sleeves 38 and 36. After the copper liner has been inserted in the jacket, as above described, the openings 42 and 44 will be aligned with the sleeves 38 and 36. The bore of the sleeve 38 is provided with a portion of enlarged diameter indicated at 46. With a suitable tool, the copper lining is flanged outward so that it laps into the portion 46 of the bore, as may be seen in Figure 2.

The mounting for the thermostat consists of a copper tube 48 in which an end cap 50 is secured by brazing. A ring or shoulder 52 is attached to the tube 48 by copper welding along the joint indicated at 54. The thermostat pocket assembled as thus described is pushed through the bore of the sleeve 38 from inside the tank. The sleeve 52 serves as a stop, being placed on the tube 48 in such a position that when it bears against the copper lining, the outer end of the tube 48 will be just flush with the outer end of the sleeve 38. I then braze the tube 48 to the sleeve 38 along the joint 56 as designated in Figure 2, and braze the ring 52 to the lining portion 12 along the line indicated at 58 in Figure 2.

The thermostat is inserted into the pocket thus provided, where it can be quickly responsive to the temperature of water within the tank, and yet can be readily removed without any trouble with packing glands, stuffing boxes or the like.

The heating element mounting is completed in somewhat the same manner. In this case, however, I provide within the steel sleeve 36 a sleeve 60 of copper, which may be rolled or expanded tightly into the steel sleeve by means of a tube roller such as used in attaching tubes to steam boilers. The copper liner portion 12 is flanged into the sleeve 60 in substantially the same way that it was flanged into the enlarged portion 46 of the sleeve 38. The flange 62 thus formed is brazed to the sleeve 60 along the line 64, and the sleeve 60 is brazed to the sleeve 36 all around the joint 66.

Flanging the copper liner into the sleeves 38 and 60, insertion of the thermostat pocket, as well as the brazing operations in connection therewith, require freedom of access to the interior of the tank. After these operations have been performed, I complete the copper liner by placing the end portion 10 on top of the cylindrical portion 12, and braze the joints between the flanges 16 and 18.

The top half of the steel jacket, which may be formed, like the bottom half, of an end portion 24 and a side wall portion 28, is then lowered over the finished copper liner and welded to the lower half of the steel jacket along the line 72. The top portion of the steel jacket may have a tapered sleeve 30, forming part of a friction fitting union like that detailed in Figure 3. By means of special tools, the bushing 20 is drawn tightly into the sleeve 30 and brazed, just as in the case of the similar fitting at the bottom of the tank. These fittings are for pipe connections to the tank, and while I have shown only two, it will be understood that as many as desired may be provided in the manner described.

The type of end fitting shown in Figure 3 has been referred to in the foregoing description of the assembly operations, but the desired results can be obtained with a modified type of fitting such as that illustrated in Figure 5. In the Figure 5 form, it will be seen that the offset in the taper is formed on the inner bushing 20, rather than in the outer sleeve 30, as in the Figure 3 form.

In either style, there is a portion of relatively short axial length (34 or 34a) at which there will be a tight fit between the bushing 20 and the sleeve 30. Adjacent the outer ends of the bushing and sleeve is an annular space 70. As the parts are being assembled, before the bushing is pushed all the way into the sleeve, I insert a ribbon of brazing material, curved in annular shape, into the space 70. Placement of the ribbon of brazing material in this manner assures good axial alignment of bushing and sleeve when they are subsequently pushed together, and also makes certain that when the brazing material is melted by the application of heat, there is a complete annular space throughout in which the melted material flows to effect a perfect seal between bushing and sleeve.

The tight fitting portion 34 or 34a, besides serving as a mechanical support for centering the bushing before the brazing operation, also serves as a stop to prevent the flow of brazing material beyond the parts to be joined and into the space between liner and jacket.

After all the joints are sealed as above described, it is obvious that an air space will still be left between the steel jacket and the copper liner as a result of the clearance or tolerance allowed for convenience in assembly. In order that the copper liner shall have the full advantage of the structural strength of the steel jacket, however, it is desirable that the lining fit tightly against the inside of the jacket.

To accomplish this result I provide a suitable fitting, such as 74 in Figures 1 and 4, opening into the space between the lining and the jacket. I first fill the tank with water to a test pressure of 300 lbs. to the square inch. Under this pressure the relatively soft and ductile liner is expanded into intimate relation with the jacket. The air in the space between the jacket and liner escapes through the fitting 74.

This first stage of the procedure constitutes a test of the inner vessel, since if there is any leak in the seams of the liner, water will escape into the interspace, and will ultimately flow out through the fitting 74.

I then apply air pressure to the fitting 74 (at some pressure lower than that of the water in the tank) and test all the seams of the outer vessel, and all the joints at tank openings with a soap solution so that any leaks will be detected. Although I have suggested the use of water and air under pressure for carrying out these tests, it will be apparent that any suitable fluids may be employed for the purpose.

Next a vacuum pump is connected to the fitting 74. After the pressure has been pumped down, I close off the pump connection by a valve and check the permanence of the vacuum by a vacuum gauge in the line between the valve and the fitting 74. If this proves satisfactory, the gauge is removed, the pressure is again pumped down, and the fitting 74 is sealed off permanently.

Tightness of the joints between jacket and liner at tank openings is important, and is provided by brazing all of them solidly together. Under certain conditions of service a vacuum may occur within the tank, and would tend to pull the lining away from the jacket. Where the lining and the jacket have been pressed into close mechanical relation by the manufacturing procedure which I have described, the interspace between them is of very small volume. In case a vacuum occurred within the tank, as suggested above, a very small movement of the copper lining away from the steel jacket would immediately increase that volume and establish a partial vacuum in the interspace. I provide a high initial vacuum in the interspace, which would prevent even slight movement of the copper lining. As long as the vacuum between lining and jacket were equal to or greater than the vacuum within the tank, there would be no tendency for the lining to be moved or distorted. The creation of a vacuum in the interspace takes the place of mechanical bonding between jacket and liner by sweating (soldering) or other means, but can be done much more economically.

Some changes may be made in the details of procedure involved in the practice of my method, and in the construction and arrangement of the parts of the devices which I have described as embodying my invention without departing from the real spirit and purpose of my invention, and it is my intention to cover by my claims any variant modes of procedure and any modified forms of structure or use of mechanical equivalents which may be reasonably included within their scope.

I claim as my invention:

1. In the manufacture of a vessel having an impervious supporting jacket and a relatively thin lining in intimate contact therewith, which lining would readily collapse if it were free to be pulled away from the supporting jacket, as by the occurrence of subatmospheric pressure in the vessel, the steps of filling the vessel with fluid under pressure and observing any leakage from the liner to the interspace, introducing between the jacket and the liner gas under a pressure less than that of said fluid and determining any leakage of the jacket, then drawing a vacuum between the jacket and liner and sealing off the space to maintain a subatmospheric pressure therebetween.

2. In the manufacture of a vessel having an impervious supporting jacket and a relatively thin lining in intimate contact therewith, which lining would readily collapse if it were free to be pulled away from the supporting jacket, as by the occurrence of subatmospheric pressure in the vessel, the steps of filling the vessel with fluid under pressure and observing any leakage from the liner to the interspace, introducing between the jacket and the liner gas under pressure less than that of said fluid, and testing joints in the jacket for leaks.

3. A vessel for holding fluid under pressure, having a rigid jacket of relatively hard metal, and a liner of relatively ductile, impervious material in close contact with the jacket, said lining being sealed to the jacket at all edges, and said vessel having a partial vacuum between the jacket and liner.

PERCY GRAY.